United States Patent
Lipka (10) Patent No.: US 11,574,123 B2
(45) Date of Patent: Feb. 7, 2023

(54) CONTENT ANALYSIS UTILIZING GENERAL KNOWLEDGE BASE

(71) Applicant: Nedim Lipka, Campbell, CA (US)

(72) Inventor: Nedim Lipka, Campbell, CA (US)

(73) Assignee: Adobe Inc., San Jose, CA (US)

( * ) Notice: Subject to any disclaimer, the term of this patent is extended or adjusted under 35 U.S.C. 154(b) by 112 days.

(21) Appl. No.: 16/829,020

(22) Filed: Mar. 25, 2020

(65) Prior Publication Data

US 2021/0303792 A1 Sep. 30, 2021

(51) Int. Cl.
*G06F 17/00* (2019.01)
*G06F 40/295* (2020.01)
*G06F 40/40* (2020.01)
*G06N 5/02* (2023.01)
*G06N 5/025* (2023.01)

(52) U.S. Cl.
CPC ............ *G06F 40/295* (2020.01); *G06F 40/40* (2020.01); *G06N 5/02* (2013.01); *G06N 5/025* (2013.01)

(58) Field of Classification Search
USPC ............................................................ 704/9
See application file for complete search history.

(56) References Cited

U.S. PATENT DOCUMENTS

| | | | |
|---|---|---|---|
| 9,594,831 B2 * | 3/2017 | Wang ................... | G06F 40/295 |
| 10,896,295 B1 * | 1/2021 | Shenoy ............... | G10L 15/1815 |
| 2016/0357857 A1 * | 12/2016 | Langmead .......... | G06F 16/3344 |
| 2017/0091320 A1 * | 3/2017 | Psota .................... | G06F 16/334 |
| 2017/0132229 A1 * | 5/2017 | Parihar ............... | G06F 16/9024 |
| 2017/0329842 A1 * | 11/2017 | Ng Tari .............. | G06F 3/04842 |
| 2019/0005020 A1 * | 1/2019 | Gregory ............... | G06V 10/457 |
| 2019/0258963 A1 * | 8/2019 | Guo ........................ | G06N 20/00 |
| 2019/0272302 A1 * | 9/2019 | Keysar .................. | G06F 16/951 |
| 2020/0007917 A1 * | 1/2020 | Schneck .......... | H04N 21/26258 |
| 2020/0057946 A1 * | 2/2020 | Singaraju ............... | G06N 5/041 |
| 2020/0065422 A1 * | 2/2020 | Yan ........................ | G06F 40/20 |
| 2021/0019339 A1 * | 1/2021 | Ghulati .................. | G06Q 50/00 |

OTHER PUBLICATIONS

Li, Jing, et al., "A Survey on Deep Learning for Named Entity Recognition", Arxiv.1812.09449, Dec. 22, 2018, 20 pages.

(Continued)

*Primary Examiner* — Paul C Mccord
(74) *Attorney, Agent, or Firm* — Kilpatrick Townsend & Stockton LLP (57) ABSTRACT

In some embodiments, a content analysis system accesses input content associated with a user of an online platform. The content analysis system extracts entity tags for entities contained in the input content and links the identities to standard entities in a knowledge base to generate linked entities. The content analysis system further generates a knowledge graph to include the linked entities and other standard entities connected to the linked entities as nodes and edges connecting these nodes. Based on the knowledge graph, the content analysis system identifies related entities that are similar to the linked entities and cause the online platform to be modified based on the related entities.

20 Claims, 7 Drawing Sheets

(56) References Cited

OTHER PUBLICATIONS

Yadav, Vikas, et al., "A Survey on Recent Advances in Named Entity Recognition from Deep Learning Models", Association for Computational Linguistics, Proceedings of the 27th International Conference Computation Linguistics, Aug. 2018, 14 pages.

Zheng, Zhicheng, et al. "Learning to Link Entities with Knowledge Base", ACM Digital Library, HLT10: Human Language Technologies: The 2010 Annual Conference of North American Chapter Association for Computational Linguistics, Jun. 2010, 9 pages.

Lin, Thomas, et al. "Entity Linking at Web Scale", AKBC-WEKEX: Proceedings of the Joint Workshop on Automatic Knowledge Base Construction and Web-Scale Knowledge Extraction, Jun. 2012, 5 pages.

Milne, David, et al. "Learning to Link with Wikipedia", -https://www.cs.waikato.ac.nz/~ihw/papers/08-DNM-IHW-LearningToLinkWithWikipedia.pdf, Oct. 2008, 10 pages.

Explosion AI, Spacy, "Linguistic Features", https://spacy.io/usage/linguistic-features#entity-linking, 2016-2020, 27 pages.

Cai, Hongyun, A Comprehensive Survey of Graph Embedding: Problems, Techniques and Applications, arXiv:1709.07604v3, Feb. 2, 2018, 20 pages.

Hamilton, William L. et al., "Representation Learning on Graphs: Methods and Applications", IEEE Computer Society Technical Committee on Data Engineering, 2017 23 pages.

\* cited by examiner

| dx_semantics | entities | support | weighted_support |
|---|---|---|---|
| visual artwork | illustration, photograph, film | 3 | 38 |
| activity | graphic design, design, photography | 3 | 30 |
| communication medium | internet forum, graphics, mobile app, video | 4 | 30 |
| creative work | video, film, work of art, application | 4 | 30 |
| software | mobile app application | 2 | 26 |
| computing platform | cloud computing, computing platform | 3 | 24 |
| image | illustration, vector graphic, video, film | 4 | 24 |
| audiovisual work | video, film, television special | 3 | 24 |
| work of art | illustration, photograph, film, work of art | 4 | 24 |
| series | design, film, video | 3 | 23 |
| moving image | video, film | 2 | 20 |
| computing infrastructure | cloud computing, computing platform | 2 | 18 |
| computer graphics | 2D computer graphics, 3D computer graphics | 2 | 16 |
| design | graphic design, design | 2 | 15 |
| graphics | 2D computer graphics, 3D computer graphics, graphics | 3 | 13 |
| art | graphics, graphic design | 2 | 10 |
| motion | video, film | 2 | 10 |
| community | online community, internet forum | 2 | 8 |
| manifestation | graphics, mobile app | 2 | 8 |
| depiction | illustration, vector graphic | 2 | 7 |

CONTENT ANALYSIS UTILIZING GENERAL KNOWLEDGE BASE

TECHNICAL FIELD

This disclosure relates generally to content analysis. More specifically, but not by way of limitation, this disclosure relates to (i) identifying general topics associated with input content based on entities contained in the input content and a knowledge base, and, in some cases, (ii) facilitating modifications to user interfaces for presenting the input content.

BACKGROUND

Interactive computing environments, such as web-based applications or other online software platforms, allow users to perform various computer-implemented functions through graphical interfaces. For example, a user can view various content (e.g., text, image, audio, video) through graphical interfaces provided by an online platform, posting content on the graphical interfaces, and so on. Different users often have different experiences within the same type of interactive environment. As such, the engagement level of the users with the interactive environment can be different. To increase the engagement level of the users, the graphical interfaces of the interactive environment can be customized for different users, such as by presenting different content to different users based on the content involved in previous interactions of the users with the interactive environment.

However, existing methods have limited capability to determine the topic of the content involved in the user interactions with the interactive environment. The information utilized by the existing methods is limited to labels of the content generated through manual processes. These labels are static and can be inconsistent for similar content labeled by different persons. As such, these methods cannot provide accurate information for effectively customizing the interactive environment.

SUMMARY

Certain embodiments involve identifying general topics associated with input content viewed by a user on an online platform and facilitating modifications to user interfaces presented to the user based on the identified general topics. In one example, a content analysis system accesses input content associated with a user of an online platform, extracts one or more entity tags from the input content, and links the extracted entity tags to a first set of standard entities in a digital knowledge base to generate a set of linked entities. The content analysis system further generates a knowledge graph by using the set of linked entities and a second set of standard entities in the knowledge base as nodes of the knowledge graph. For each of the nodes in the knowledge graph, the content analysis system generates a graph embedding and identifies related entities from the knowledge graph based on the graph embeddings. For example, the content analysis system determines a similarity metric between a linked entity and a standard entity in the knowledge graph using the graph embeddings of the nodes and identifies the standard entity as a related entity if the similarity metric is higher than a threshold metric of similarity. A user interface presented on the online platform can be modified to present content that matches at least one of the related entities to increase a level of engagement of the user with the online platform.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments involve identifying general topics associated with input content viewed by users of an online platform based on a knowledge base and, in some cases, facilitating modifications to user interfaces presented to the users based on the identified general topics. In some examples, the general topics are represented by higher-level entities that are related to the entities identified from the input content. For instance, a content analysis system analyzes input content associated with a user (e.g., webpages viewed by the user) to extract entity tags for entities contained, mentioned or otherwise referenced in the input content, such as persons, locations, organizations, products, and so on. The content analysis system further links the extract entity tags to standard entities in a knowledge base to generate linked entities. A standard entity is an entity named with a standard identifier that is unique in the knowledge base, such as "SUV," "Barack Obama," "New York City." Based on the linked entities and the knowledge base, the content analysis system identifies further entities that are related to the linked entities. These related entities can include higher-level entities of which a linked entity is an instance, a member or a part. Examples of linked entities and the corresponding higher-level entities include "SUV" and "vehicle," "Barack Obama" and "president," "New York City" and "city." As such, these higher-level entities can represent the general topics of the content that the user has viewed and be utilized to modify the user interfaces of the online platform to personalize the content presented to the users.

The following non-limiting example is provided to introduce certain embodiments. In this example, a content analysis system is included and is configured to identify a higher-level topic for content viewed or otherwise accessed by a user of an online platform. The content analysis system analyzes the content, such as webpages, viewed by the user of the online platform to determine the main segment of the content for analysis. For instance, the content analysis system can determine the various segments of the content by analyzing the structure of the content (e.g., the document object model (DOM)). From the identified segments of the content, the content analysis system can select one or more segments as the main segments for further analysis.

The content analysis system analyzes the content in the main segments, such as the text, image, audio, or video, to identify entities using entity recognition technology and extract entity tags for the identified entities. The identified entities or the extracted entity tags can be linked to standard entities in a digital knowledge base, such as the Wikidata and/or Wikipedia, using entity linking technologies to generate linked entities. The content analysis system further generates a knowledge graph based on the linked entities and the knowledge base. For example, the knowledge graph can include nodes representing the linked entities and edges representing the relationship between two nodes connected by the edge. The knowledge graph can further include other standard entities in the knowledge base that are associated with or connected to the linked entities.

Continuing this example, the content analysis system is further configured to select entities from the knowledge graph that are related to the linked entities in the knowledge graph, referred to as related entities. In some examples, the selection can be performed based on the structure of the knowledge graph. The content analysis system can determine an entity in the knowledge graph as a related entity if the entity has a specified relationship with a linked entity. In alternative or additional examples, the content analysis system can determine related entities based on graph embeddings of the nodes in the knowledge graph. The graph embedding of a node can be a multi-dimensional embedding vector representing the underlying characteristics, representations, and encodings of the node. The graph embedding of a node can be determined based on the structure of the knowledge graph, such as the entities connected to the entity represented by the node and their respective relations with the node. The graph embedding of a node can also be determined based on data associated with the entity of the node, such as a description of the entity. Entities in the knowledge graph having a graph embedding that is similar to the embedding of a linked entity can be identified as a related entity.

Furthermore, the content analysis system ranks the related entities according to the relevance of the related entity to the input content. The relevance of a related entity can be determined based on the number of linked entities that are affiliated to the related entity or the number of occurrences of these linked entities in the input content. The top ones in the ranked related entities can be used to modify or personalize the user interfaces of the online platform to present content.

The determined related entities can also be used in many other applications. For example, the related entities can be utilized to build profiles for users. Based on the profiles of users, an online platform can deliver targeted content that is more relevant to a user, or a group of similar users. The related entities can also be utilized to generate a human-readable description of the interest or preference of a user or a group of users. Related entities can be identified for different users of an online platform. The collection of related entities can be utilized to analyze the categories of content that the users are interested in to provide valuable insights for the content provider.

The determined related entities can also be utilized to identify causal relations between viewing and buying behavior and/or to leverage the correlation of content with user segments for the expansion of relevant segments (such as "look alike" modeling based on content consumption). For example, a topic or a combination of topics that a user is interested in and is unique to this user can be explored to discover additional users or user segments that are also have similar interests.

As described herein, certain embodiments provide improvements to interactive computing environments by solving problems that are specific to online platforms. These improvements include more effectively configuring the content presented in an interactive computing environment based on accurate and precise evaluations of the user's interest or preference within the interactive computing environment. Facilitating these types of modifications involves identifying the preference or interest of a user with respect to the interactive computing environment in real-time or near real-time. This is particularly difficult in that the interest or preference of the user may be changing depending on the content the user is viewing or the operations the user is performing or has performed. These ephemeral, rapidly transitioning changes make it uniquely difficult to evaluate the user interest or preference within an interactive computing environment. In addition, for an interactive computing environment hosting a large amount of content including user-created content, the existing manual labeling process cannot timely provide the identification of topics that match users' interests.

Further, by linking input content to standard entities in a common knowledge base, the description for the identified topics are consistent for different users and different content on the interactive computing environment. For instance, if a related entity is found being termed as "vehicles," this term will be used consistently for other users or other webpages as well. Alternative terms, such as "automobiles" will not be used. Moreover, the technologies of identifying topics and interests for users allow the identified topics and interests to be generalized to a higher level. As a result, the personalized content generated for users is not limited to the same type of content previously viewed by the user. Rather, content with a broader scope can be identified and generated for the user. For example, the content analysis system implementing the technologies presented here may determine that the interest of a user who has viewed a webpage describing a HONDA® CRV® is SUVs or vehicles, rather than HONDA® CRV® itself. As a result, webpages describing other SUV models or any types of vehicles can be presented to the user. Consequently, certain embodiments can enable more comprehensive and more relevant content to be provided to the user based on the identified user interest.

As used herein, the term "online platform" is used to refer to an interactive computing environment, hosted by one or more servers, that includes various interface elements with which user devices interact. For example, clicking, tapping or otherwise interacting with one or more interface elements during a session causes the online platform to present electronic content, query electronic content, or otherwise interact with electronic content that is accessible via the online platform.

As used herein, the term "entity" is used to refer to items, which may be topics, concepts, or objects. An entity can be an object, such as persons, locations, organizations, products, etc., that can be denoted with a proper name, such as Donald Trump, New York City, United States. An entity can also be concepts or topics such as president, city, country, etc. An entity can be associated with a level indicating its generality. A higher-level entity is more general than a lower-level entity. For example, the entity "city" has a level higher than that of the entity "New York City" because "city" is more general than "New York City" and can cover many cities including New York City. In some examples, the level of generality of an entity can be determined based on the relationship between the entities. For example, if a first entity has a relationship such as "belong to," "member of," "part of," or "instance of" with a second entity, the first entity is less general and thus has a level lower than the second entity.

As used herein, the term "digital knowledge base" or "knowledge base" in short is used to refer to a comprehensive library of information about one or more fields that are known to the human being. The knowledge base contains at least standard entities and semantic relationships between the standard entities. Each standard entity can have a description associated therewith to describe the property or characteristic of the entity. The knowledge base can be used as a common source of knowledge. For example, Wikidata and/or Wikipedia can be used as a knowledge base.

As used herein, the term "standard entity" is used to refer to an entity named with a standard identifier that is unique in the knowledge base. For example, "vehicle" can be used as a standard entity in the knowledge base to represent a car entity, an automobile entity, and a vehicle entity. The use of the standard terms for entities in the knowledge base can eliminate alternative labels for entities and standardize the names for various entities.

As used herein, the term "linked entity" is used to refer to an entity that is identified from input content and is linked to or matches a standard entity in the knowledge base. For example, an entity "Turkey" identified from an input webpage becomes a linked entity after it is linked to a standard entity "Turkey" in the knowledge base that represents the country Turkey. Thus, this linking process also involves entity disambiguation.

As used herein, the term "knowledge graph" is used to refer to a graph built for an input content. The knowledge graph includes a set of nodes connected through edges. A node of the knowledge graph represents entities such as a linked entity identified from the input content, a standard entity of the knowledge base that is connected to a linked entity, or other types of entities. An edge of the knowledge graph connects to two nodes and represents the relationship between the corresponding two entities according to the knowledge base. The knowledge base provides further edges to other standard entities.

As used herein, the term "graph embedding" is used to refer to a multi-dimensional embedding vector representing the underlying characteristics, representations, and encodings of a node of a knowledge graph. For example, the graph embedding for a node can include a vector representing the entities that the node is connected to or a vector representing the content (e.g., text or image) of a description of the entity represented by the node.

Figure 1:
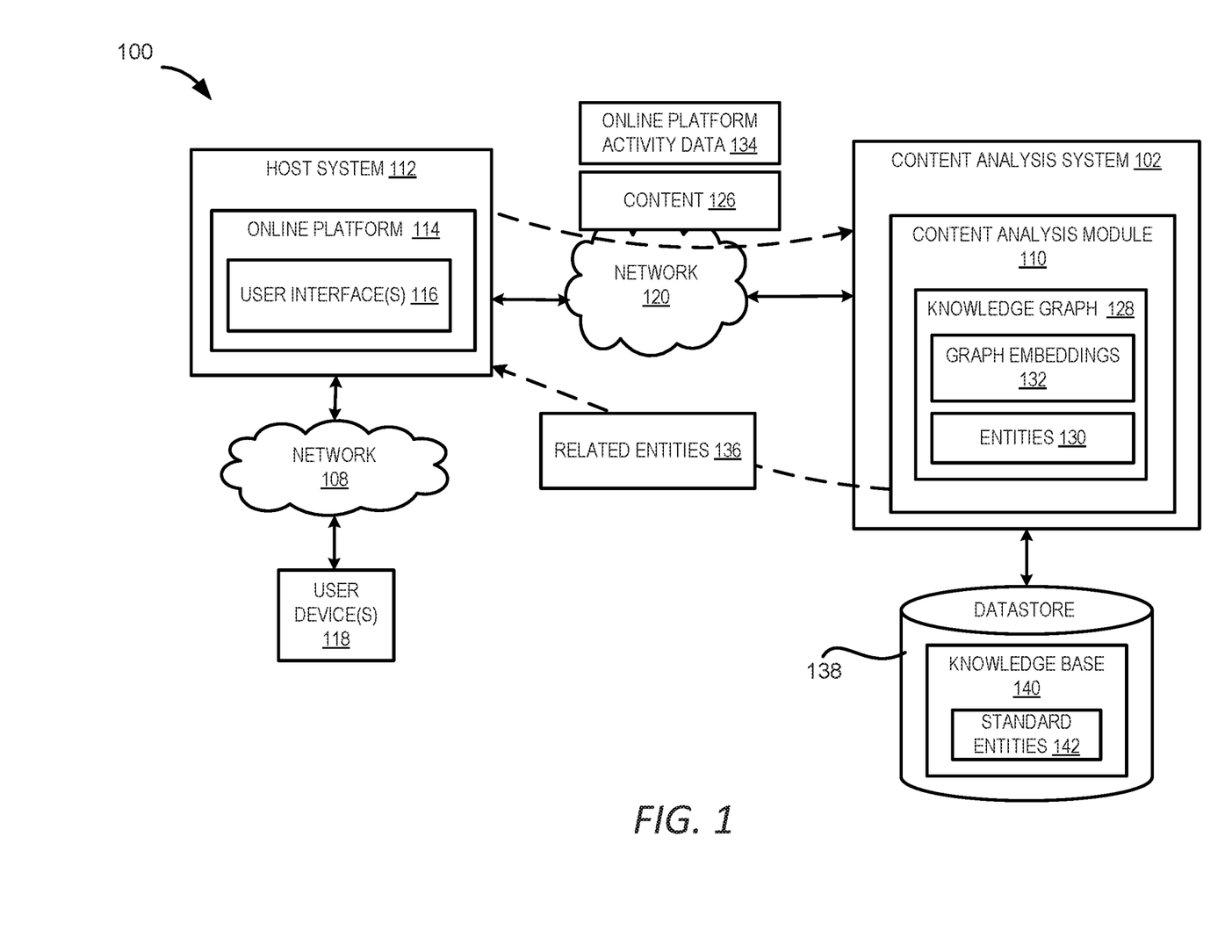
FIG. 1 depicts an example of a computing environment in which a content analysis system can be used to analyze the content viewed by users of an online platform and facilitate modifications to the online platform, according to certain aspects of the present disclosure.

Referring now to the drawings, FIG. 1 is an example of a computing environment 100 in which a content analysis system 102 can be used to analyze the content on an online platform 114 provided by a host system 112 and, in some cases, facilitate modifications to the online platform 114. In various embodiments, the computing environment 100 includes the content analysis system 102 and the host system 112.

One or more user devices 118 interact with the online platform 114, such as through user interface(s) 116 over a network 108. The network 108 may be a local-area network ("LAN"), a wide-area network ("WAN"), the Internet, or any other networking topology known in the art that connects the user devices 118 to the host system 112. The interactions can include users visiting and browsing through content hosted by the online platform 114 through the user interfaces 116, users posting content to the online platform 114 through the user interface 116, and so on. The interactions between the users or their associated user devices 118 and the online platform 114 can be saved as online platform activity data 134. The online platform activity data 134 can include, for example, an identifier (e.g., the URL) of the content viewed or contributed by the users and the time when the interaction occurred. In some examples, the users are identified by their respective cookie IDs associated with the activities.

The host system 112 records the online platform activity data 134 associated with the online platform 114 and transmits the online platform activity data 134 through a network 120 to the content analysis system 102 for analysis. The network 120 may be the same as, or different from, the network 108 and may also be a LAN, a WAN, the Internet, or any other networking topology known in the art that connects the host system 112 to the content analysis system 102. In some cases, the online platform activity data 134 is transmitted to the content analysis system 102 by the individual user devices 118. Based on the online platform activity data 134, the content analysis system 102 can access the content 126 involved in the interaction between the users and the online platform 114 to perform the analysis.

The content analysis system 102 employs a content analysis module 110 to identify entities 130 and extract entity tags for the entities 130 from the content 126. The content analysis module 110 can parse the content, such as a webpage, into segments and determine the main segment that represents the main content of the input content 130. For example, the content analysis module 110 can divide a webpage presenting an online article into an advertisement segment, a title segment, a main text segment, a user comments segment, and so on. The main text segment can be identified as the main segment for analysis. To identify the entities 130, the content analysis module 110 can apply named-entity recognition technologies to the main segment.

Based on the identified entities, the content analysis module 110 can further match these entities with the standard entities in a knowledge base 140. The matching can be performed through entity linking technologies. As a result of the matching, entities identified from the content 126 can be matched or linked to standard entities in the knowledge base 140. These matched entities are referred to as linked entities. The content analysis module 110 can further build a knowledge graph 128 based on the linked entities and the knowledge base 140.

The knowledge graph 128 can be built to include nodes representing the linked entities. The knowledge graph 128 can further include standard entities in the knowledge base 140 that are connected to a linked entity through one or more hops. For example, standard entities in the knowledge base 140 that have a direct connection with a linked entity can be included in the knowledge graph 128. Standard entities that are connected to linked entities through one or more other entities can also be included in the knowledge graph 128. The knowledge graph 128 can also include edges. An edge connects to two nodes and represents the relationship between the entities represented by the two nodes. In some implementations, the knowledge graph 128 can further include other types of nodes and the associated edges, such as nodes representing the content (e.g., the webpages), and nodes representing the users who have viewed the webpages (e.g., the cookie IDs associated with the users).

Based on the knowledge graph 128, entities that are related to the entities associated with the input content, referred to as "related entities 136," can be identified. For example, related entities can include entities having a higher level of generality than a linked entity. Information associated with these related entities can be used to provide a meaningful and human-readable description of the general topics that are of interest to the users. In some examples, the content analysis module 110 identifies the related entities 136 by querying the knowledge graph 128 for entities that have a specified relationship with a linked entity. For instance, an entity in the knowledge graph 128 that has an affiliation relationship such as "member of," "part of," or "instance of" with a linked entity can be identified as a related entity 136. In other words, if a linked entity is a member of, a part of, or an instance of an entity, the entity can be identified as a related entity. Although the description here focuses on edges indicating affiliation relationship, edges with other types of relationships can also be included in the knowledge graph. For example, relationships such as "uses," "located/found in" and other properties can also be valuable to determine the general topic or a related entity for a user.

In alternative or additional examples, the content analysis module 110 identifies related entities 136 based on graph embeddings 132 that represent the underlying characteristics of the nodes representing the entities. The content analysis module 110 can generate the graph embedding 132 for a node based on the structure of the knowledge graph 128 at the node or based on the information or description of the entity represented by the node. Additional details about generating the graph embeddings and utilizing the embeddings to identify related entities 136 are provided below with regard to FIG. 2.

The related entities 136 can be transmitted to the online platform 114 and used to personalize the content presented to the users. In other examples, the content analysis module 110 generates a description or a label of the general topic that the user is interested in based on the related entities 136. The generated description or label can be transmitted to the online platform 114 for use in the modification of the user interfaces 116. In further examples, the content analysis module 110 can rank the related entities 136 according to their similarities to the content 126. The related entities 136 that are more similar to the content 126 than others are transmitted to the online platform 114 or used to determine the general topic that is of interest to the user. Additional details regarding generating the related entities 136 are provided below with regard to FIG. 2-6.

As mentioned above, the content analysis module 102 may transmit the received related entities 136 or the general topic determined based on the related entities 136 to the host system 112. In some embodiments, doing so causes the host system 112 to modify the online platform 114 to improve its performance. The host system 112 can apply a model or perform searches based on the related entities 136 or the generated general topics for different users to find content that matches the general topics, including text, image, video, or audio. Based on the returned results, the online platform 114 can, for example, modify the user interfaces 116 in different ways for different users to present the content that is of interest to the users. For instance, the online platform 114 can generate new layouts or rearrange the layout of the user interfaces 116 differently to present different content for different users to keep users engaged with the online platform 114. Other ways of changing user interfaces 116 can also be performed. In addition to modifying the user interfaces 116, the host system 112 may also utilize the generated general topic or general interest of the user for other applications such as generating user profiles, analyzing the distribution of viewers for different categories of content on the online platform 114, or a combination thereof.

In addition, the host system 112 can also modify other aspects of the online platform 114. For example, the host system 112 can modify the content that is communicated to a user device 118, such as an email sent to the user device 118, based on the general topic or general interest of the user. The host system 112 may also change the way the online platform 114 communicates or interacts with the user devices 118 based on the general topic or general interest, such as changing from presenting a webpage content to sending an email or vice versa.

One or more computing devices are used to implement the content analysis system 102 and the host system 112. For instance, the content analysis system 102, the host system 112, or both could include a single computing device, a group of servers or other computing devices arranged in a distributed computing architecture, etc. The online platform 114 can be any suitable online service for interactions with the user devices 118. Examples of an online platform include a content creation service, a query system, etc. In some embodiments, one or more host systems 112 are included in the computing environment 100 and they are third-party systems that operate independently of the content analysis system 102 (e.g., being operated by different entities, accessible via different network domains, etc.). In additional or alternative embodiments, one or more host systems 112 include a content analysis system 102 as part of a common computing system. The user device 118 may be any device that is capable of accessing an online service. For non-limiting examples, user device 118 may be a smartphone, smart wearable, laptop computer, desktop computer, or other types of the user device.

Figure 2:
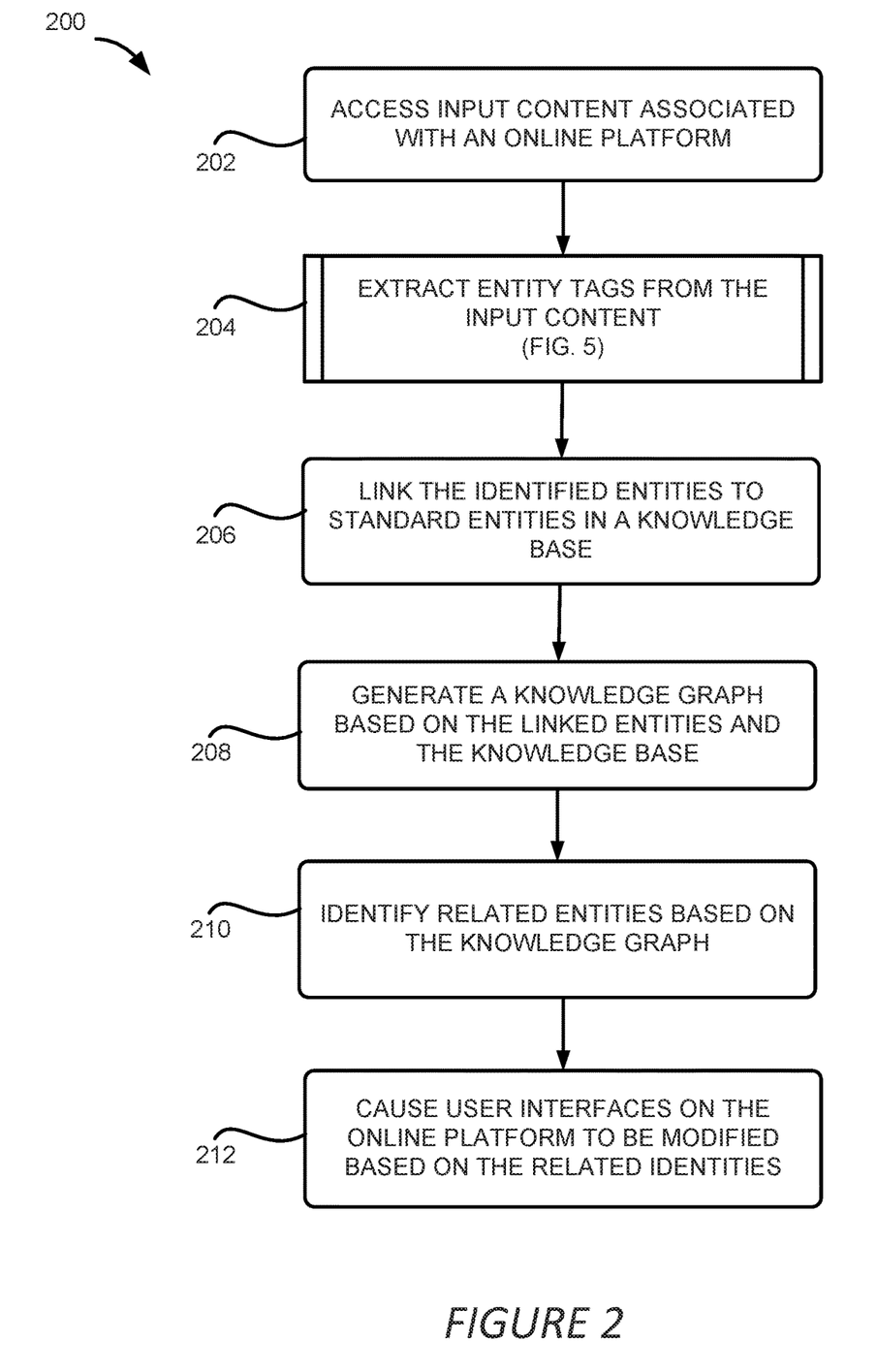
FIG. 2 depicts an example of a process for facilitating the modification of an online platform based on analysis of the content viewed by users associated with the online platform, according to certain aspects of the present disclosure.

FIG. 2 depicts an example of a process 200 for facilitating the modification of an online platform 114 based on related entities 136 of the content 126 or the general topic determined based on the related entities 136 of the content 126. One or more computing devices (e.g., the content analysis system 102) implement operations depicted in FIG. 2 by executing suitable program code (e.g., program code implementing the content analysis module 110). For illustrative purposes, the process 200 is described with reference to certain examples depicted in the figures. Other implementations, however, are possible.

At block 202, the process 200 involves accessing input content 126 associated with an online platform 114, such as webpages presented on the online platform 114. For instance, interactions between user devices 118 and the online platform 114, as well as other data associated with the user devices 118 and the online platform 114, can be recorded and used to generate the online platform activity data 134. The host system 112 or another computing system configured for generating the online platform activity data 134 sends the online platform activity data 134 to the content analysis system 102. The online platform activity data 134 can include, for example, an identifier (e.g., the URL) of the content viewed or contributed by the users and the time when the interaction occurred. In some examples, the users are identified by their respective cookie IDs associated with the activities. Based on the user interface interaction data 134, the content analysis system 102 can retrieve the content 126 (e.g., through the URL of the webpages) via suitable communications with the online platform 114 or another system where the content 126 is stored.

At block 204, the process 200 involves extracting entity tags for entities 130 from the content 126. The entities 130 can include real-world objects or abstract concepts or topics. In some examples, the content analysis system 102 determines the entities 130 by parsing the content 126 into segments and performing entity recognition on main segments of the content 126. Additional details of parsing the content 126 and extracting entity tags for the entities 130 are provided below with regard to FIGS. 5 and 6.

At block 206, the process 200 involves linking or matching the identified entities 130 to standard entities 142 in a knowledge base 140. As discussed above, the knowledge base 140 can include standard entities 142 that are unique in the knowledge base 140 and the semantic relationship between the standard entities 142. Linking an identified entity 130 to a standard entity 142 allows ambiguities to be resolved and the identified entity 130 to be uniquely labeled. The content analysis system 102 can employ any entity linking (EL) technologies to perform the linking. Entity linking assigns a unique identity (such as the standard entity) to the entities mentioned in a text (such as the entities 130 identified from the content 136). Entity linking can be performed using text-based approaches where textual features are extracted from large text corpora and utilized to link to the unique identity, such as term frequency-inverse document frequency, word co-occurrence probabilities, etc. Entity linking can also be performed using graph-based approaches. In this type of approach, large knowledge graphs are built based on text corpora (such as the knowledge base 140) and extract complex features by taking into account the knowledge graph topology and multi-step connections between entities. These features can be utilized to link a given entity with a standard entity. The entities 130 that can be linked to a standard entity 142 in the knowledge base 140 are referred to as linked entities.

At block 208, the process 200 involves generating a knowledge graph 128 for the content 126 based on the linked entities and the knowledge base 140. The content analysis system 102 can identify the standard entities 142 in the knowledge base 140 that are connected to at least one linked entity and add these standard entities to the knowledge graph 128. For example, standard entities in the knowledge base 140 that have a direct connection with a linked entity can be included in the knowledge graph 128. Standard entities that are connected to a linked entity through one or more other entities can also be included in the knowledge graph 128. In some implementations, the content analysis system 102 builds the knowledge graph 128 by including the standard entities 142 that are no more than three hops away from a linked entity.

Figure 3:
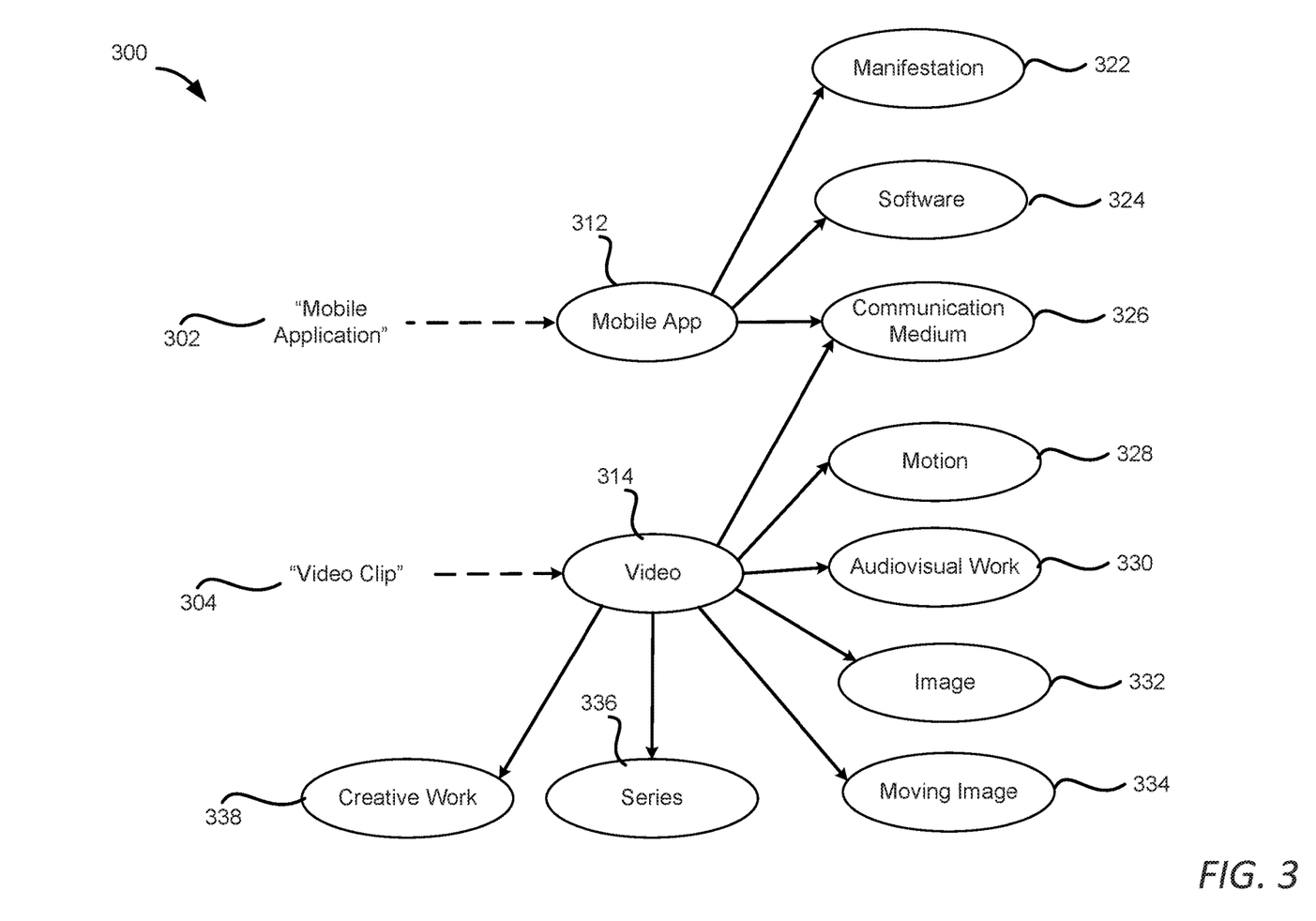
FIG. 3 depicts an example of a knowledge graph built based on linked entities in input content and a knowledge base, according to certain aspects of the present disclosure.

FIG. 3 shows an example of a knowledge graph 300. In this example, the input content includes ADOBE® CREATIVE CLOUD® webpages. Two of the entities identified by the content analysis system 102 from the input content are "mobile application" and "video clip." Each of these two entities can be linked to a standard entity based on the knowledge base, Wikidata in this example. The standard entity that is linked to the entity "mobile application" is the "mobile app" entity and the standard entity that is linked to the entity "video clip" is the "video" entity. Based on these two linked entities, the content analysis system 102 analyzes the Wikidata to identify other standard entities that are connected to the linked entity "mobile app" such as the standard entities "manifestation" 322, "software" 324, and "communication medium" 326. These standard entities are added to the knowledge graph 300. Similarly, the content analysis system 102 also identifies other standard entities that are connected to the linked entity "video" such as the entities "communication medium" 326, "motion" 328, "audiovisual work" 330, "image" 332, "moving image" 334, "series" 336. and "creative work" 338. These standard entities are also added to the knowledge graph 300. As shown in FIG. 3, a standard entity can be connected to more than one linked entity. Each edge in the knowledge graph 300 shows the affiliation relationship between the two entities connected by it, i.e., the entity next to the tail end of the edge is an instance, a member or a part of the entity next to the head end of the edge. Thus, the entity at the head end of an edge is more general than the entity at the tail end of the edge.

In additional examples, the knowledge graph 128 can be expanded to include nodes and edges representing non-standard entities and their relationships, such as the users who have viewed the content, the webpages involved in the content 126. Further nodes and edges can be added based on external knowledge sources, such as business data describing the current event occurring at a location represented by the nodes in the knowledge graph 128, whether the user is a customer, etc. In some cases, the content 136 may have annotations associated therewith. For example, a webpage content can have exiting tags previously labeled automatically or manually. These annotations can be utilized to further extend the knowledge graph 128, for example, by including more entities specified by the annotations and edges connecting these additional entities with other entities in the knowledge graph 128 or the knowledge base 140.

Returning to FIG. 2, at block 210, the process 200 involves identifying related entities 136 based on the knowledge graph 128. As discussed above, the related entities 136 include entities that are related to the linked entities, such as an entity having a higher level of generality than a linked entity. In some examples, the content analysis system 102 identifies the related entities 136 by querying the knowledge graph 128 for entities that have a specified relationship with a linked entity. For example, the relationship can be an affiliation relationship in that the standard entity is more general than the linked entity. The relationship between the linked entity and the standard entity can include "belong to," "part of," "member of," or "instance of." For instance, if the linked entity is a HONDA CRV, the related entities can include standard entities such as an entity "SUV" or an entity "vehicle" because the HONDA CRV is an instance of SUV which is an instance of a vehicle. The affiliation relation between the related entity and the linked entity can include one hop or multiple hops. In the above example, the linked entity "HONDA CRV" has the affiliation relation to the standard entity "SUV" through one hop and has the affiliation relation to the standard entity "vehicle" through two hops.

In further examples, the content analysis system 102 identifies related entities 136 based on graph embeddings 132 that represent the underlying characteristics of the nodes representing the entities. The content analysis system 102 can generate the graph embedding 132 for a node based on the structure of the knowledge graph 128 at the node or based on the information or description of the entity represented by the node. To determine a graph embedding for a particular node in the knowledge graph 128, the content analysis module 110 can identify the nodes connected to the particular node and generate a vector representation of these connected nodes as the graph embedding. The vector representation can further be expanded, for example, by adding more dimensions to include values representing the edges (i.e., the relationships) between the particular node and the connected nodes. By constructing the graph embedding in this way, two nodes, and thus the entities represented by the two nodes, are similar if their graph embeddings are similar.

Alternatively, or additionally, the graph embedding for a node can be generated based on other information associated with the entity represented by the node, such as the descriptions of the entity. As discussed above, each entity in the knowledge base 140 can have a description associated therewith, such as a Wikipedia article. The content analysis module 110 can extract keywords or other features from the description of the node to generate a vector of values as the graph embedding 132 for the node. As a result, nodes having similar descriptions will have similar graph embeddings. The graph embedding generated based on the graph structure and the description can be used alone or in combination to determine the related entities 136. Other ways of finding the graph embeddings can be utilized. For example, a machine learning model can be built and used to output graph embedding for a node based on the features of the node such as the graph structure at the node, the description of the node, and so on.

To determine the related entities 136, the content analysis module 110 can compute the similarity metric between the linked entity and other entities in the knowledge graph 128 using the graph embeddings. For example, the similarity metric between the linked entity and another entity can be computed as the correlation between the graph embeddings of these two entities, the inverse of the distance between the graph embeddings of these two entities, or any other types of similarity measures between the graph embeddings of the two entities. Those entities whose similarity metrics to a linked entity are higher than a threshold metric of similarity can be determined as the related entities 136. In other examples, an entity whose similarity metric is higher than the threshold metric of similarity and whose generality level is higher than a linked entity can be determined as a related entity 136.

In some cases, the content analysis module 110 can further filter and rank the related entities 136 based on their relevance to the content 126. The relevance can be determined based on a relevance score that measures the meaningfulness of the related entities 136. For example, the relevance score can be calculated as the number of linked entities affiliated to the related entity. The higher the number is, the related entity is more relevant to the content 126 and thus ranked higher. In other examples, the relevance score of a related entity can be calculated as the number of occurrences of linked entities that are affiliated to the related entity in the content 126. The higher the number of occurrences is, the related entity is more relevant to the content 126 and thus ranked higher. Note that the number of linked entities affiliated to the related entity, the number of occurrences of linked entities are merely used as examples for ranking the related entities and should not be construed as limiting. Various other ways of ranking and filtering the related entities can be employed.

Figure 4:
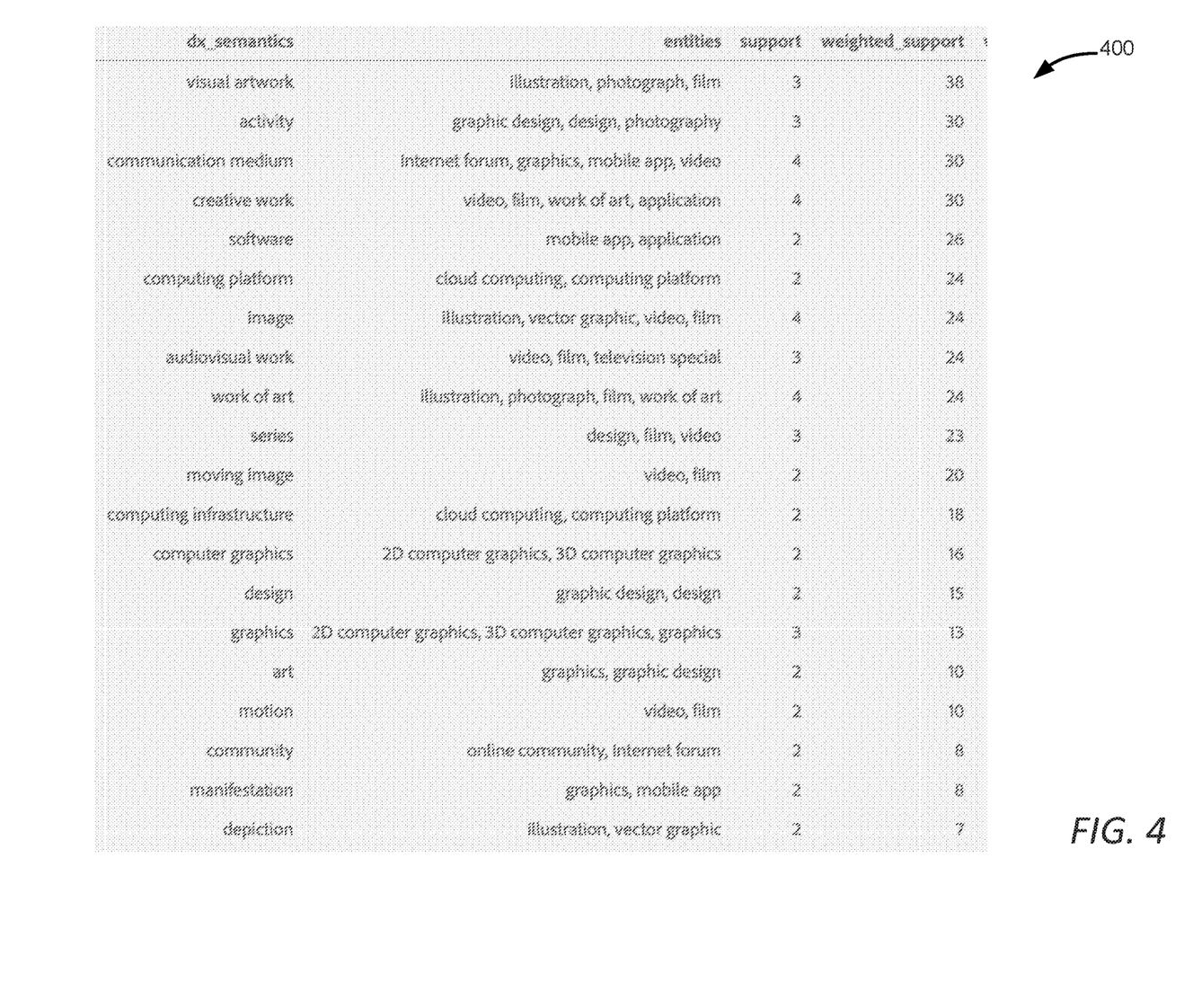
FIG. 4 depicts an example of determining relevance scores for ranking related entities, according to certain aspects of the present disclosure.

FIG. 4 shows an example of ranking the related entities 136 according to the number of occurrences. In this example, table 400 is shown to list the information regarding the related entities identified for input content and the respective associated linked entities. The input content in this example is the same as the input content for FIG. 3. The knowledge graph shown in FIG. 3 covers a portion of the linked entities and related entities shown in FIG. 4. In table 400, each row represents one related entity. The first column of each row lists the corresponding related entity. The second column lists the linked entities associated with the input content and connected to the corresponding related entity. The third column lists the number of linked entities shown in the second column and the fourth column shows the number of occurrences of these linked entities in the input content. The related entities in table 400 are listed according to a descending order of the number of occurrences of the linked entities. For example, as shown in FIG. 4, the related entity "visual artwork" is ranked first because the linked entities associated with "visual artwork," i.e., entities "illustration," "photograph," and "film," appear in the input content 38 times in total. The related entity "activity" is listed second as its linked entities—"graphic design," "design," "photography"—appear 30 times in the input content. Based on the ranked related entities, the content analysis system 102 can output the top N related entities as the related entities 136, where N is a natural number.

Referring back to FIG. 2, at block 212, the process 200 involves causing the online platform 114 to be modified based on the related entities 136 (e.g., the top N ranked related entities, where N is a positive integer). For example, the content analysis system 102 can transmit the related entities 136 to the host system 112 via a local area network, a wide area network, or some combination thereof. In other examples, the content analysis system 102 summarizes the related entities 136 to generate general topics or general interests of users and transmits the general topics/interests to the host system 112. Based on the received related entities 136 or general topics/interests, the host system 112 can modify interface elements on the user interfaces (e.g., webpages) to present content that matches the received related entities 136 or general topics/interests of the users thereby increasing the engagement level of the users with the online platform 114.

Figure 5:
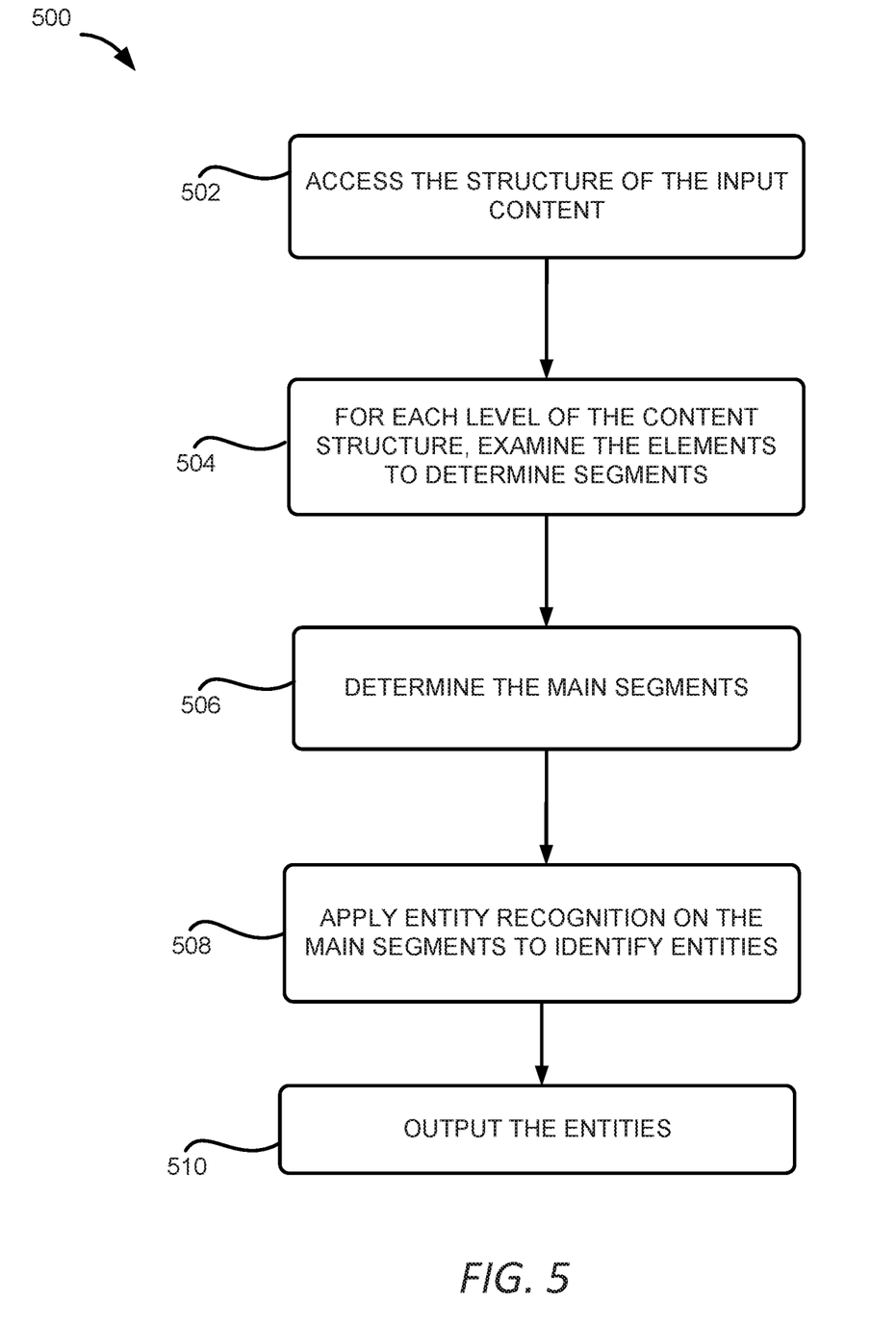
FIG. 5 depicts an example of a process for extracting entity tags for entities from input content, according to certain aspects of the present disclosure.

FIG. 5 depicts an example of a process 500 for extracting entity tags for entities 130 from input content 136, according to certain aspects of the present disclosure. One or more computing devices (e.g., the content analysis system 102) implement operations depicted in FIG. 5 by executing suitable program code (e.g., program code implementing the content analysis module 110). For illustrative purposes, the process 500 is described with reference to certain examples depicted in the figures. Other implementations, however, are possible.

Figure 6:
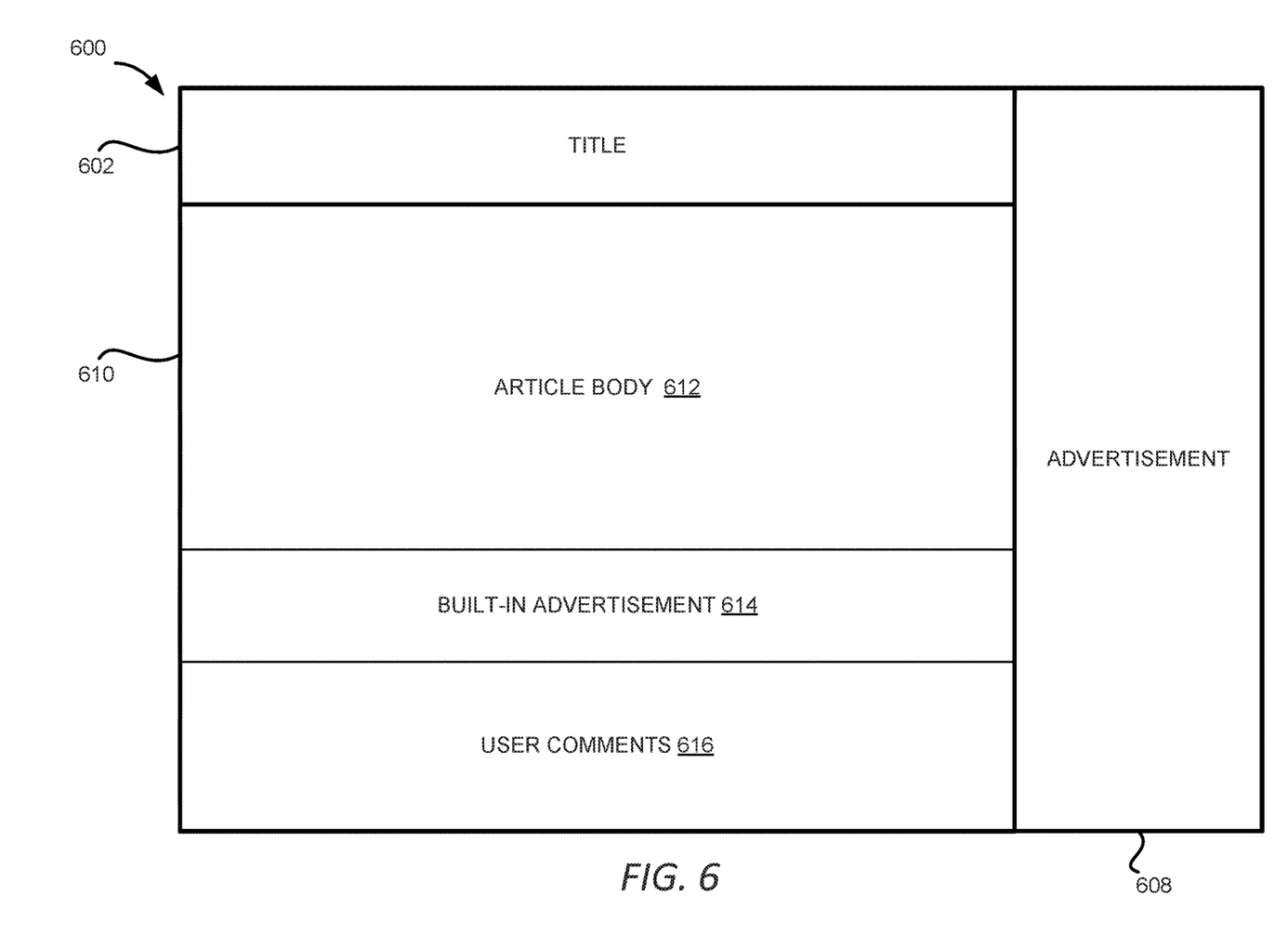
FIG. 6 depicts an example of decomposing a webpage into segments for identification of entities, according to certain aspects of the present disclosure.

At block 502, the process 500 involves accessing the structure of the input content 136. For example, if the input content 136 includes a webpage or another type of document, the content analysis module 110 can access the DOM of the document to determine the structure of the input content 136. The DOM of a document describes all the elements in the document, including both visible and invisible elements and hierarchically organizes these elements. In this hierarchy, the root object represents the entire document (e.g., the entire webpage) and child objects of the root object can represent different elements of the document. Each of the child objects can further have child objects. FIG. 6 shows an example of a webpage 600 and elements contained in the webpage. In this example, the root object represents the entire webpage 600. The root object has three child objects: an object 602 representing the title element, an object 610 representing the content portion of the webpage 600, and an object 608 representing the advertisement element. Among these three objects, object 610 has three child objects: a child object 612 representing the article body, a child object 614 representing built-in advertisement 614 and a child object 616 representing the user comments. Based on the structure, the content analysis module 110 can determine the main segments of the content 136 and identify the identities 130 from the main segments.

Returning to FIG. 5, at block 504, the process 500 involves examining each level of the structure of the content to determine segments. In some examples, the root level is examined first. The content analysis module 110 can examine each child object of the current object to determine if any of the child elements can be marked as a segment. In some examples, whether to mark an element as a segment can be based on the relative size of the child element versus the size of its parent object. For instance, the content analysis module 110 can determine a child element as a segment if the relative size of the child element with respect to the size of the parent element is lower than a granularity parameter. The granularity parameter can be set to a value between 0 and 1, such as 30%, 50%, 70% and so on.

Table 1 shows an example of the pseudo-code for determining the segments from the content 136. The procedure shown in Table 1 can start with the root of DOM: PROCESS_ELEMENT(root, root.box.width, root. box. height, granularity). The bounding box of the root object represents the entire document. Once there is a direct child of the root object that has a bounding box p % (=p granularity) smaller than the root, a new segment is marked. For child objects that are larger than the p % of the root, their child objects are analyzed. Recursively, if the bounding box of an element is not p % smaller than its parent's bounding box, its child elements are examined. The comparison of bounding box sizes is relative to the size of the last visible ancestor. In order to avoid "orphans," segments are created if a node has a sibling that became a segment and has no children that became a segment. It should be understood that the values in Table 1 are for illustration purposes and should not be construed as limiting. Various other values can be selected depending on factors such as the type of the content, the intended presentation devices of the content or a combination thereof.

In the example shown in FIG. 6, the process of identifying segments can start with the root object 600, and then recursively analyze the three children objects 602, 608 and 610. Assuming the granularity parameter is set to 0.5, the child object 602 can be identified as a segment because its size is smaller than 50% of the size of the object 600. Likewise, the advertisement object 608 is also identified as a segment because its size is smaller than 50% of the size of the object 600. For child object 610, the content analysis module 110 can recursively examine its child objects. According to the above procedure, the child objects 612, 614 and 616 are each compared with the size of their parent object 610 to determine if the granularity requirement is satisfied. Because the sizes of the child objects 614 and 616 are each smaller than 50% of the size of the object 610, they can each be marked as a segment. For the child object 612, its size does not satisfy the granularity requirement. However, since its sibling objects (i.e., objects 614 and 616) have been processed, the object 612 can also be identified as a segment. It should be understood that the pseudo-code listed in Table 1 and described above is only one example for determining the segments from the content 136. Various other methods can be utilized to identify the segments.

Referring back to FIG. 5, at block 506, the process 500 involves determining the main segment(s) of the content 136. The content analysis module 110 can determine the main segment by analyzing the content of the segments identified at block 504. For example, the content analysis module 110 can process the text, image, video or audio contained in each segment to determine the topics discussed in each segment or analyze the size and location of each segment to determine the importance of the segment. Based on the analysis, the content analysis module 110 can further determine the category of each segment, such as the title, main body, advertisement, user comments, etc. The analysis and determination can be utilized to select the main segments for entity recognition. For example, a segment having a large size and positioned in the middle of the document can be determined as a main segment. In another example, in addition to the size and location, the segment also needs to contain a nontrivial amount of text, image, video or audio related to the same topic. Other ways of determining the main segments can also be utilized. In the example shown in

TABLE 1

An example of procedure for determining segments in a document

```
PROCESS_ELEMENT(elem, parent_width, parent_height, granularity):
    elem_width = elem.boundingbox.width
    elem_height = elem.boundingbox.height
    maxArea=parent_width * parent_height * granularity
    if IS_VISIBLE(elem) and not IS_TOO_LARGE_OR_SMALL(elem, maxArea):
    then:   (a) "create segment, generate id, store attributes of segment"
            (b) "analyze content of segment" [[optional]]
              SET_IS_PROCESSED (elem, true)
        else:
            For all children child of elem:
                if IS_VISIBLE(elem):
                    then: PROCESS_ELEMENT(child, parent_width, parent_height,
granularity)
                    else: PROCESS_ELEMENT(child, elem_width, elem_height, granularity)
                if HAS_PROCESSED_CHILD(elem):
                    //create segments for each visible and unprocessed child node
                    SET_IS_PROCESSED(elem, true)
IS_TOO_LARGE_OR_SMALL(elem, maxArea, minArea=1000):
    return (elem.boundingbox.width < 10 || elem.boundingbox.height < 10 ||
    elem.boundingbox.width * elem.boundingbox.height < minArea ||
    elem.boundingbox.width * elem.boundingbox.height > maxArea);
```

FIG. 6 where the title element 602, the advertisement element 608, the article body 612, the built-in advertisement 614 and the user comments 616 can each be identified as a segment as discussed above, the article body 612 can be identified as the main segment due to its size and location, and, in some cases, the content of the article body 612. In additional examples, the main segments can also be identified by receiving a user input after a user is presented with the identified segments.

At block 508, the process 500 involves extracting entity tags for entities 130 recognized from the main segments of the content 136. The recognition can be performed using any named entity recognition (NER) technology. NER is the process of locating and classifying named entities in text into predefined entity categories. The NER can include rule-based, unsupervised learning, feature-based supervised learning, and deep-learning-based approaches. For example, unsupervised learning can include a clustering-based approach that extracts entity tags for named entities from the clustered groups based on context similarity. The deep-learning-based approaches utilize a deep learning model, such as a neural network, to predict the named entities based on the input text. Other ways of recognizing the name entities can be utilized. At block 510, the process 500 involves outputting the entity tags for the recognized entities 130.

Example of a Computing System for Implementing Certain Embodiments

Figure 7:
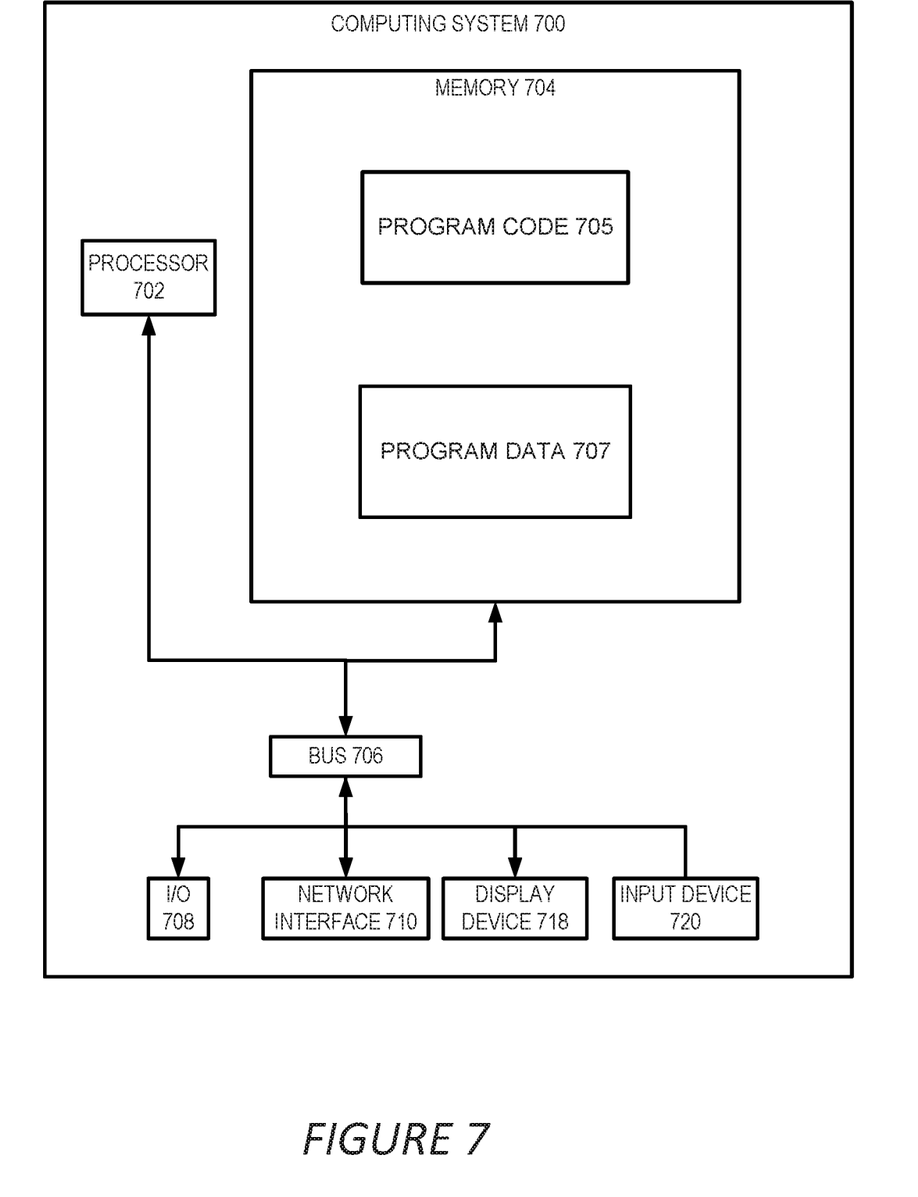
FIG. 7 depicts an example of a computing system for implementing certain aspects of the present disclosure.

Any suitable computing system or group of computing systems can be used for performing the operations described herein. For example, FIG. 7 depicts an example of the computing system 700. The implementation of computing system 700 could be used for one or more of a content analysis system 102 and a host system 112. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 executes program code 705 that configures the processor 702 to perform one or more of the operations described herein. Examples of the program code 705 include, in various embodiments, the content analysis module 110 by the content analysis system 102, the online platform 114, or other suitable applications that perform one or more operations described herein (e.g., one or more development applications for configuring the online platform 114). The program code may be resident in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include interaction data, performance data, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computing system 700. The buses 706 communicatively couples one or more components of a respective one of the computing system 700.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices via a data network using the network interface device 710.

The computing system 700 may also include a number of external or internal devices, an input device 720, a presentation device 718, or other input or output devices. For example, the computing system 700 is shown with one or more input/output ("I/O") interfaces 708. An I/O interface 708 can receive input from input devices or provide output to output devices. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the content analysis system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices associated with a content analysis system perform operations comprising:
    accessing, by a processor executing program code instructions, input content associated with a user of an online platform;
    extracting, by the processor executing program code instructions, one or more entity tags from the input content;
    linking, by the processor executing program code instructions, the extracted entity tags to a first set of standard entities in a digital knowledge base to generate a set of linked entities;
    generating, by the processor executing program code instructions, a knowledge graph by using the set of linked entities and a second set of standard entities in the digital knowledge base as nodes of the knowledge graph, wherein the second set of standard entities is connected to the first set of standard entities in the digital knowledge base and is identified based on a number of hops between the second set of standard entities and the set of linked entities in the digital knowledge base;
    generating a graph embedding for each of the nodes in the knowledge graph;
    identifying, by the processor executing program code instructions, related entities from the second set of standard entities in the knowledge graph, wherein identifying each of the related entities comprises:
        determining a similarity metric between a linked entity and a standard entity in the second set of standard entities in the knowledge graph using the graph embeddings of the nodes; and
        identifying the standard entity as a related entity based on the similarity metric being higher than a threshold metric of similarity; and
    causing a user interface presented on the online platform to be modified to present content that matches at least one of the related entities to increase a level of engagement of the user with the online platform.

2. The method of claim 1, wherein extracting the entity tags from the input content comprises:
    accessing a structure of the input content, the structure describing elements in the input content and hierarchically organizing the elements;
    determining segments of the input content based on the structure;
    identifying at least one main segment from the segments of the input content; and
    identifying the one or more entities from the main segment.

3. The method of claim 2, wherein the segments of the input content are determined based on sizes of the elements in the input content.

4. The method of claim 1, wherein generating the graph embedding for a node comprises:
    identifying description associated with an entity represented by the node from the digital knowledge base; and
    generating graph embeddings based, at least in part, upon the description associated with the entity.

5. The method of claim 1, wherein generating the graph embedding for a node in the knowledge graph that represents an entity comprises:
    identifying entities connected to the entity according to the knowledge graph; and
    generating the graph embedding for the entity based, at least in part, upon the entities connected to the entity.

6. The method of claim 1, wherein identifying the related entities further comprises:
    querying the knowledge graph to identify a standard entity that has a specified relationship with a linked entity as a related entity.

7. The method of claim 6, wherein the specified relationship is selected from a group of relationships comprising: belong to, a part of, an instance of, and a member of.

8. The method of claim 1, further comprising ranking the related entities, wherein the user interface presented on the online platform is modified based, at least in part, upon a first related entity from the ranked related entities.

9. The method of claim 8, wherein ranking the related entities comprises:
for each of the related entities, determining a number of linked entities affiliated to the related entity; and
ranking the related entities in descending order of the respective number of affiliated linked entities.

10. The method of claim 8, wherein ranking the related entities comprises:
for each of the related entities, determining a number of occurrences of linked entities that are affiliated to the related entity in the input content; and
ranking the related entities in descending order of the respective number of occurrences.

11. A system comprising:
a memory device maintaining a digital knowledge base, wherein the digital knowledge base comprises standard entities and relations between the standard entities; and
a processor system configured for performing operations comprising:
extracting one or more entity tags from input content associated with an online platform;
linking the one or more extracted entity tags to a first set of standard entities in the digital knowledge base to generate a set of linked entities;
generating a knowledge graph by using the set of linked entities and a second set of standard entities in the digital knowledge base as nodes of the knowledge graph, wherein the second set of standard entities is connected to the first set of standard entities in the digital knowledge base and is identified based on a number of hops between the second set of standard entities and the set of linked entities in the digital knowledge base;
generating a graph embedding for each of the nodes in the knowledge graph;
identifying at least one related entity from the second set of standard entities in the knowledge graph, and wherein identifying the at least one related entity comprises:
determining a similarity metric between a linked entity and a standard entity in the second set of standard entities in the knowledge graph using the graph embeddings of the nodes; and
identifying the standard entity as a related entity based on the similarity metric being higher than a threshold metric of similarity; and
wherein the at least one related entity is usable for changing a user interface presented on the online platform to improve user experience of the online platform.

12. The system of claim 11, wherein the knowledge graph further comprises nodes representing non-standard entities.

13. The system of claim 11, wherein extracting the one or more entity tags from the input content comprises:
accessing a structure of the input content, the structure describing elements in the input content and hierarchically organizing the elements;
determining segments of the input content based on the structure;
identifying at least one main segment from the segments of the input content; and
identifying the one or more entities from the main segment.

14. The system of claim 13, wherein the segments of the input content are determined according to sizes of the elements in the input content.

15. The system of claim 11, wherein generating the graph embedding for a node comprises:
identifying description associated with an entity represented by the node from the digital knowledge base; and
generating graph embeddings based, at least in part, upon the description associated with the entity.

16. The system of claim 11, wherein generating the graph embedding for a node in the knowledge graph that represents an entity comprises:
identifying entities connected to the entity according to the knowledge graph; and
generating the graph embedding for the entity based, at least in part, upon the entities connected to the entity.

17. A non-transitory computer-readable medium having program code that is stored thereon, the program code executable by one or more processing devices for performing operations comprising:
extracting entity tags from input content associated with an online platform;
linking the extracted entity tags to a first set of standard entities in a knowledge base to generate a set of linked entities;
generating a knowledge graph by using the set of linked entities and a second set of standard entities in the knowledge base as nodes of the knowledge graph, wherein the second set of standard entities is connected to the first set of standard entities in the knowledge base and is identified based on a number of hops between the second set of standard entities and the set of linked entities in the knowledge base;
generating a graph embedding for each of the nodes in the knowledge graph;
identifying related entities from the second set of standard entities in the knowledge graph, and wherein identifying each of the related entities comprises:
determining a similarity metric between a linked entity and a standard entity in the second set of standard entities in the knowledge graph using the graph embeddings of the nodes; and
identifying the standard entity as a related entity based on the similarity metric being higher than a threshold metric of similarity; and
wherein the related entities are usable for changing a user interface presented on the online platform to improve user experience of the online platform.

18. The non-transitory computer-readable medium of claim 17, wherein the operations further comprise ranking the related entities, wherein the user interface presented on the online platform is modified based, at least in part, upon a first related entity from the ranked related entities.

19. The non-transitory computer-readable medium of claim 18, wherein ranking the related entities comprises:
for each of the related entities, determining a number of linked entities affiliated to the related entity; and
ranking the related entities in descending order of the respective number of affiliated linked entities.

20. The non-transitory computer-readable medium of claim 18, wherein ranking the related entities comprises:
for each of the related entities, determining a number of occurrences of linked entities that are affiliated to the related entity in the input content; and ranking the related entities in descending order of the respective number of occurrences.

* * * * *